H. S. Davis,
Crimping Leather.

N° 4,603.        Patented June 27, 1846.

Witnesses:
Oliver D. Gorwens
H. S. Roberts.

Inventor:
Henry S. Davis.

UNITED STATES PATENT OFFICE.

HENRY S. DAVIS, OF WESTERNVILLE, NEW YORK.

BOOT-CRIMP.

Specification of Letters Patent No. 4,603, dated June 27, 1846.

*To all whom it may concern:*

Be it known that I, HENRY S. DAVIS, of Westernville, in the county of Onedia and State of New York, have invented a new and useful Improvement on Machines for Crimping Boot-Fronts; and I do hereby declare that the following is a full, clear, and exact description of the construction and operation of the same, reference being had to the drawings, (on a scale of two inches to one foot,) making a part of this specification, in which—

Figure 3:
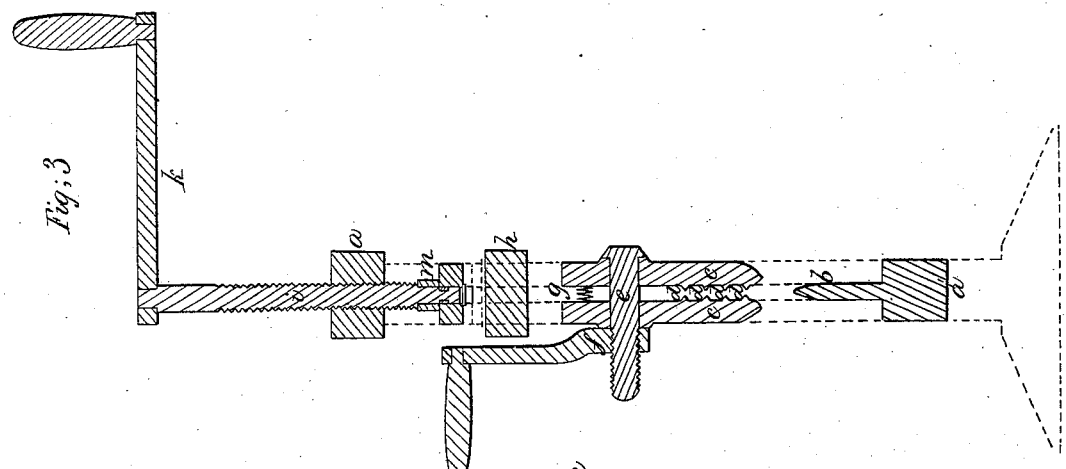
Figure 2:
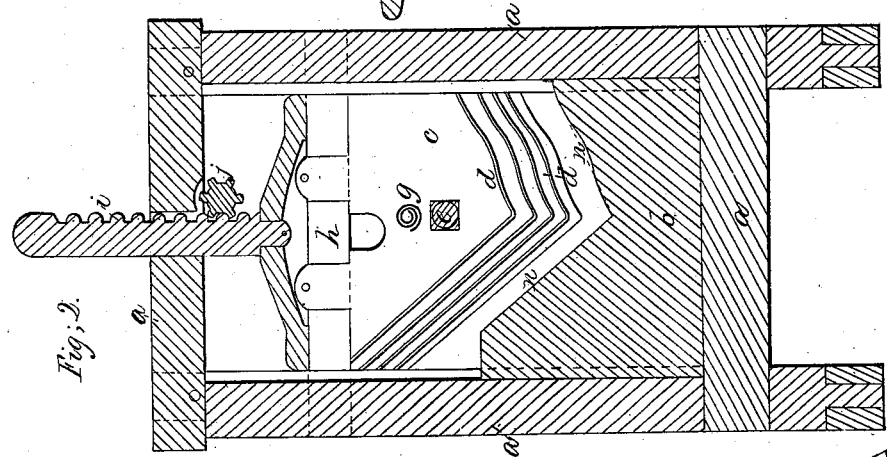
Figure 1:
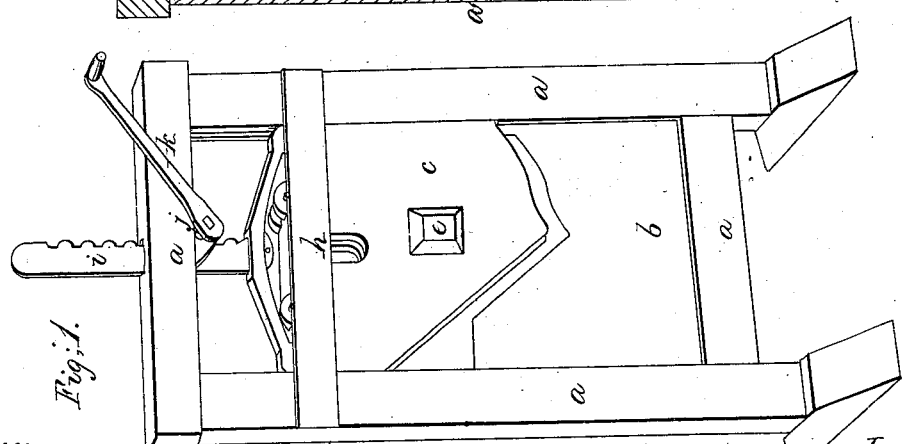

Figure 1 is a perspective view, Fig. 2 a longitudinal section and Fig. 3 is a cross section.

$a$, $a$, $a$, $a$, frame of the machine, $b$, form or mold upon which the "boot front" is crimped or shaped, $c$ jaws with teeth or scrapers $d$, $d$, $d$, $d$, which pass down on each side of the form or mold and scrapes stretches or crimps the "boot front" into a proper form, $e$, and $f$, screw-bolt and nut with crank to press the jaws together $g$, spiral spring to open the jaws when the nut $f$, is loosened $h$, movable beam to which the jaws are attached, $i$ and $j$, rack and pinion attached to the cap of the frame and the lower end of the rack to the movable beam $h$, for the purpose of working the jaws, $k$, crank to the pinion $j$ and to the screw $l$, for the purpose of working the same, $l$, screw and crank with a swivel joint $m$, for the purpose of working the jaws instead of the rack and pinion when a greater power is required. The lines $n$, $n'$, form the angle of the form or mold which angle is 104 degrees the proper angle for a "boot front".

The operation of the machine is in this wise the leather for the "boot front" being properly placed upon the form or mold $b$, and the distance between the jaws properly adjusted by the screw-bolt and crank $e$, and $f$, the crank $k$ being turned will operate upon the pinion and rack $j$ and $i$, or upon the screw $l$, (as the case may be) which will cause the jaws to descend one on each side of the form $b$ when the teeth or scrapers $d$, $d$, $d$, $d$, will act upon the leather pressing and scraping it downward and outward until it shall have assumed the exact form of the upper edge of the form or mold thus accomplishing the object much more rapidly and effectively than can be done without the proper angle and the teeth or scrapers to the jaws.

I claim—

The invention of the teeth or scraper as constructed by me on the inside of the jaws, and conformed exactly to the angle of the jaws and mold.

HENRY S. DAVIS.

Witnesses:
OLIVER D. GROSVENOR,
H. S. ROBERTS.